Dec. 17, 1968  D. C. MULLER  3,416,642

PRESSURELESS ACCUMULATION CONVEYOR

Filed Dec. 28, 1966  5 Sheets-Sheet 1

INVENTOR.
DONALD C. MULLER
by Huebner & Worrel
ATTORNEYS.

United States Patent Office 3,416,642
Patented Dec. 17, 1968

3,416,642
PRESSURELESS ACCUMULATION CONVEYOR
Donald C. Muller, Whittier, Calif., assignor to C. F. Butz Engineering, Azusa, Calif., a corporation of California
Filed Dec. 28, 1966, Ser. No. 605,473
14 Claims. (Cl. 198—34)

ABSTRACT OF THE DISCLOSURE

A chain reaction stopping and spacing mechanism in a conveyor for preventing bunching of a series of articles on the conveyor. A forward roller assembly is disengageable from the power source by pressure of a leading article on that roller assembly, and tie means connects such roller assembly to roller assemblies sequentially following so as to disengage such following roller assemblies from the power source simultaneously with the forward roller assembly thereby preventing bunching of articles.

---

Prior to this invention conveyor systems did not provide a satisfactory, simple and automatic means for stopping or removing articles carried thereon without pressure accumulation of packages to the rear. If articles were stopped on the conveyor, even the systems which incorporated some apparatus to prevent package accumulation did not entirely eliminate the pressure of packages to the rear, so that jamming or buckling was likely to occur. Hence, the only really satisfactory means to stop a package was by switching off the machine or disengaging the drive mechanism through the operation of suitable controls. Also, no automatic spacing occurred between the articles thereon, so that when turning a corner on a conveyor the ends of adjacent articles might abut and tend to dislodge them from the conveyor.

Therefore, it is a primary object of this invention to provide a conveyor system in which an article can be stopped anywhere thereon, and articles to the rear thereof will sequentially stop automatically and accumulate without pressure or bunching between the articles.

Another object of this invention is to provide a conveyor wherein the articles carried thereon are automatically spaced from each other.

Still another object of this invention is to provide a conveyor in which articles can be stopped in pressureless accumulation and when the first stopped article of the group is released or removed, the articles to the rear will start moving in sequence, thereby lowering the starting force required and automatically spacing the articles therealong.

A further object of this invention is to provide a pressureless accumulation conveyor which can be easily adjusted and having readily removable components adapted to facilitate maintenance replacement and repair.

A still further object of this invention is to provide means for mechanically stopping an article on a pressureless accumulation conveyor without stopping the conveyor driving mechanism.

Briefly, a pressureless accumulation conveyor in accordance with this invention includes an endless drive belt supported by rollers mounted in an enlongated frame and turned by a suitably engaged motor. Disposed in engagement therewith on top of the drive belt and longitudinally spaced evenly from each other are a plurality of laterally extending power rollers which are rotated by the belt. Supported by the frame, but pivotally mounted thereon (except for those furthest to the rear) are a plurality of laterally extending roller assemblies, each of which is spaced from the other and is above and adjacent to one of the power rollers.

A rear roller in each roller assembly is adapted to engage and be turned by the adjacent power roller and, in turn, rotate a forward trigger roller through a mutually engaged intermediate idler wheel. Counterweights extend down from each roller assembly and are positioned to cause the forward trigger roller to be lifted slightly from the frame. However, when the weight of a package is imposed on the trigger roller, it is depressed so that the top surfaces of the trigger roller and rear roller are in the same plane so as to provide a level surface upon which to carry packages or other articles.

A connecting shaft joins a plate attached to each roller assembly to the power roller of another roller assembly disposed a predetermined distance to the rear. This shaft is adapted to disengage this connected power roller from the adjacent rear roller when the forward roller assembly to which it is attached is depressed by the weight of a package or other article, and to engage the power roller when the weight of the package is removed. The conveyor is adjusted so that the disengaged roller assemblies are those immediately to the rear of a package carried thereon, thus preventing articles to the rear from being pushed forward by the pressure of engaged roller assemblies. Hence, to stop articles from accumulating, the drive belt does not need to be stopped nor does its motor need to be turned off since the power rollers are disengaged from the drive belt.

An optional unloading area can be added to provide mechanical stoppage of packages by linking a group of power rollers to an apparatus which can controllably disengage a group of power rollers from their adjacent roller assemblies.

Other objects and advantages will become apparent from the following description and drawings:

Referring to the drawings a conveyor in accordance with this invention includes an elongated frame 10 comprising a pair of parallel, upright, spaced apart, outer side walls 10a and 10b (each shown as a pair of channels welded together) connected at the bottom by a plurality of longitudinally spaced lateral floor channels 10c extending between them. The frame 10 is substantially open at the top save for an occasional spacer rod 10d extending between the upper portions of the side walls 10a and 10b to provide additional stability therefor. A plurality of upright legs 12 are connected to the bottom of the floor channels 10c and rest on a floor 13 to provide support for the frame 10. The number and location of legs 12 will vary in accordance with the length and weight of frame 10 though normally there will be at least a pair of spaced legs 12 supporting each end of frame 10.

In the embodiment of the conveyor shown in the drawings the top surface 10e and 10f of the frame side walls 10a and 10b, respectively, are in the same horizontal plane when the conveyor is in operative position. Positioned between the side walls 10a and 10b and below the top surfaces 10e and 10f thereof is a flat endless conveyor belt 14 extending longitudinally slightly less than the length of frame 10. It is supported at each end thereof by belt end rollers 14a and 14b mounted on horizontal axles 14c and 14d, respectively, which are secured between laterally spaced, parallel, vertical inner mounting walls 15a and 15b supported by floor channels 10c between the opposing walls 10a and 10b of frame 10 thereby providing belt 14 with a substantially horizontal top surface in a plane roughly parallel with but below the top surfaces 10e and 10f of frame 10.

Preferably conveyor belt 14 is driven by a motor 16 centrally disposed below frame 10 within a motor housing 16a. The motor 16 rotates a motor pulley 16b which, in turn, rotates a belt drive roller 16c having an axial shaft 16d mounted in housing 16a parallel to end rollers 14a and 14b, through a connecting drive belt 16e engaged with an outer circumferential pulley portion 16f of drive roller 16c. Belt drive roller 16c is frictionally engaged within a lower portion of conveyor belt 14 which, in turn, loops around a damping roller 18 rotatably mounted on a shaft 18a parallel to drive roller 16c and carried by a damping roller support structure 18b secured to motor housing 16a. Damping roller 18 is resiliently mounted to tension conveyor belt 14 for limited movement longitudinally of frame 10 by a damping spring 18c secured on the damping roller support 18b. The motor 16 moves belt 14 on end rollers 14a and 14b longitudinally of frame 10 so as to provide the conveyor with a rear receiving end 19a upon which packages or articles 19b are loaded and a head or forward discharge end 19c from which said packages or articles 19b are normally unloaded.

Disposed so that their upper surfaces protrude above the top surfaces 10e and 10f of frame 10 are a plurality of longitudinally spaced roller assemblies 20. These assemblies 20 extend laterally between said walls 10a and 10b and substantially normal thereto. The uppermost surfaces of the roller assemblies 20 are adapted to be disposed substantially in the same plane so as to provide a movable package platform for packages or articles 19b carried thereon.

The roller assemblies 20 are comprised of an inverted hat-shaped channel 22 slightly shorter than the distance between side walls 10a and 10b and plates 22a and 22b which are welded to the opposite ends thereof and normal thereto.

A trigger or forward roller 14 is rotatably secured laterally between end plates 22a and 22b forward of and axially parallel to channel 22 by axial hexagonal end shaft 24a protruding therefrom into mating complementary openings 24b in the forward portions 24c of plates 22a and 22b. These forward portions 24c are to be disposed nearest the discharge end 19c of the conveyor when mounted therein.

On the opposite side of each channel 22 from forward roller 24 is a substantially identical pivot or rear roller 26 which is rotatably secured laterally between plates 22a and 22b and axially parallel to roller 24 by hexagonal axial end shafts 26a mounted in complementary openings 26b in the rear portions 26c of plates 22a and 22b.

Figures 5, 6:
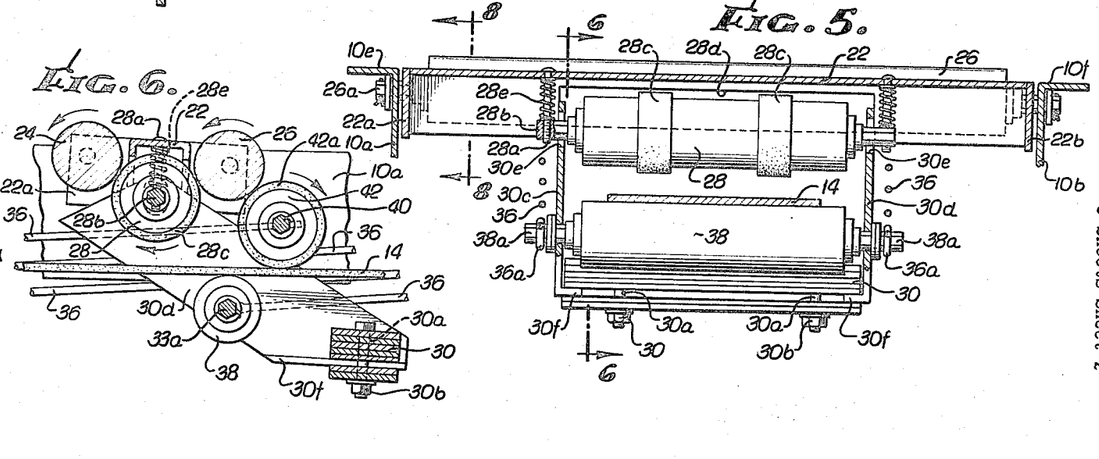
FIGURE 5 is a cross-sectional, partly elevational fragmented view of a pivotally mounted roller assembly, a counterweight secured thereto, a power roller, and associated portions of the conveyor belt and connecting rods taken on line 5—5 in FIGURE 3.
FIGURE 6 is a fragmented sectional, partly elevational and partly phantom view taken on line 6—6 in FIGURE 5.

An idler wheel 28 axially parallel with the axes of rollers 24 and 26 is rotatably suspended by a pair of laterally spaced threaded bolts 28a which are secured centrally in the top surface of channel 22 inwardly of end plates 22a and 22b and extend down into engagement with complementarily threaded holes in the hexagonal end shafts 28b which protrude from each end of idler wheel 28. A pair of laterally spaced tires or engaging bands 28c, best seen in FIGURE 5, are circumferentially secured to the periphery of idler wheel 28 which, when wheel 28 is adjusted to operative position within a cut-out central portion 28d of channel 22, bear against both rollers 24 and 26 so as to transmit rotary motion between them. A spring 28e is mounted around each bolt 28a to bear against the underside of the channel 22 and shaft 28b to prevent the bolts 28a from becoming unscrewed by machine vibration and to equalize the bearing pressure on rollers 24 and 26 so that idler wheel 28 is substantially self-centering.

Each of the roller assemblies 20 (except for a group to be positioned on the receiving end 19a of the conveyor) carries a counterweight 30 comprised of a stack of metal plates secured together by a pair of bolts 30a vertically projecting through mating holes therein and threadably engaged by nuts 30b. The counterweight 30 is supported laterally beneath and to the rear of idler wheel 28 by a pair of spaced counterweight supporting plates 30c and 30d. An elongated oval opening 30e, slightly wider than the thickness of idler wheel shafts 28b, is formed near one corner of each counterweight supporting plates 30c and 30d, and aligned so that when idler wheel shafts 28b are inserted therethrough the remote end portions of plates 30c and 30d, which are formed with inturned flanges 30f, are disposed to the rear of pivot roller 26. The ends of the plates forming counterweight 30 are, in turn, roughly the length of wheel 28, and spaced to fit flanges 30f of opposing plates 30c and 30d between them so as to be secured in a predetermined position by tightening nuts 30b on bolts 30a. It can be seen that the amount of weight can be varied by adding or subtracting the number of plates comprising counterweight 30, and its adjustment relative to pivot roller 26 varied by sliding it along flanges 30f.

Figures 4, 7, 8, 9:
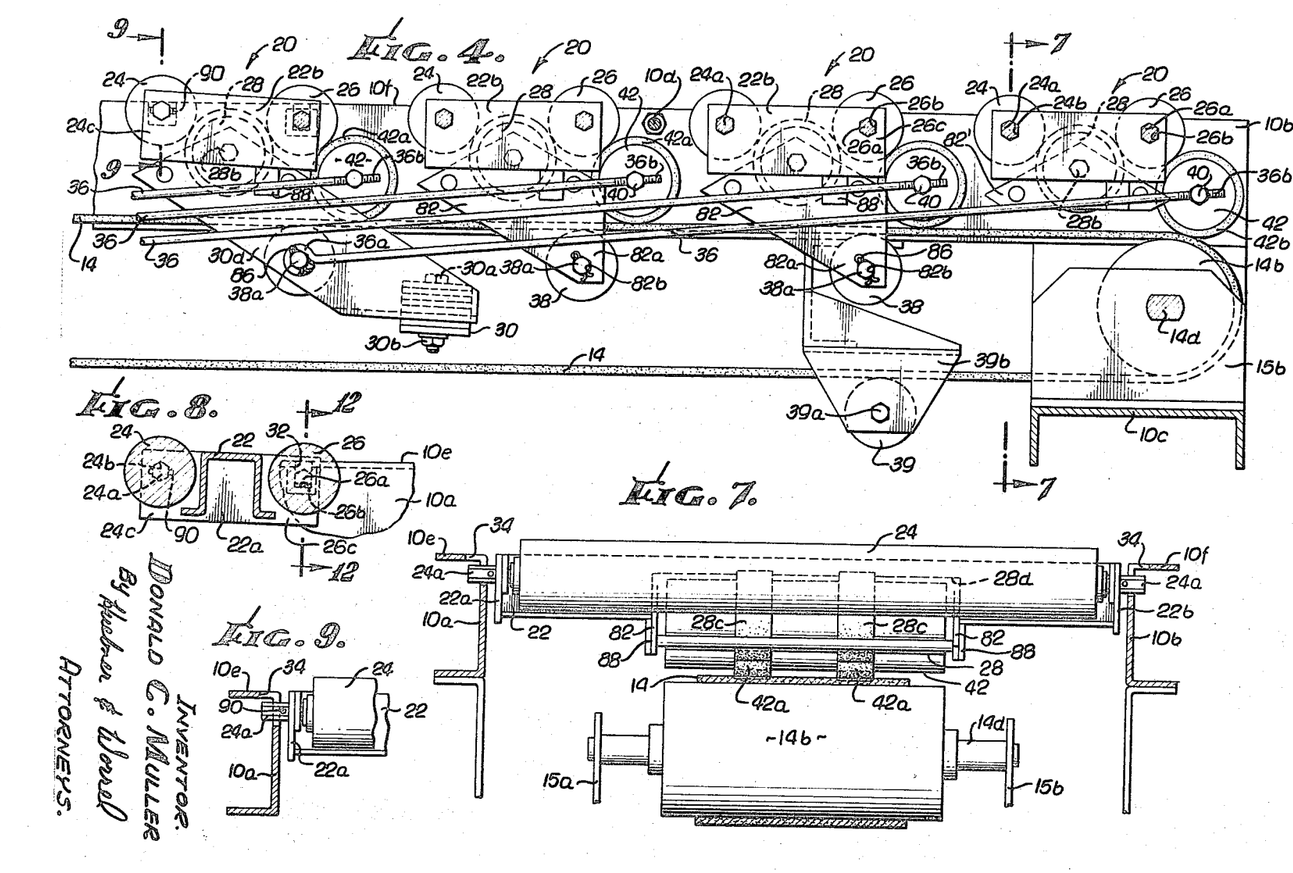
FIGURE 4 is a sectional, partly fragmented side view of an upper portion of the receiving end of the conveyor to the rear of the portion shown in FIGURE 3, and taken along the same line 3—3 as in FIGURE 2.
FIGURE 7 is a sectional, partly evelational and partly phantom view taken on line 7—7 in FIGURE 4.
FIGURE 8 is a fragmented cross-sectional, partly elevational and partly phantom view taken on line 8—8 in FIGURE 5.
FIGURE 9 is a fragmented partly sectional, partly elevational view of a roller and connection therefor taken on line 9—9 in FIGURE 4.

A group of three roller assemblies 20, in this embodiment of the invention, which are to be mounted nearest to the receiving end 19a of the conveyor, as shown in FIGURE 4, do not carry counterweights, and are not mounted in the conveyor, so as to be able to pivot, as described hereinafter.

Figure 3:
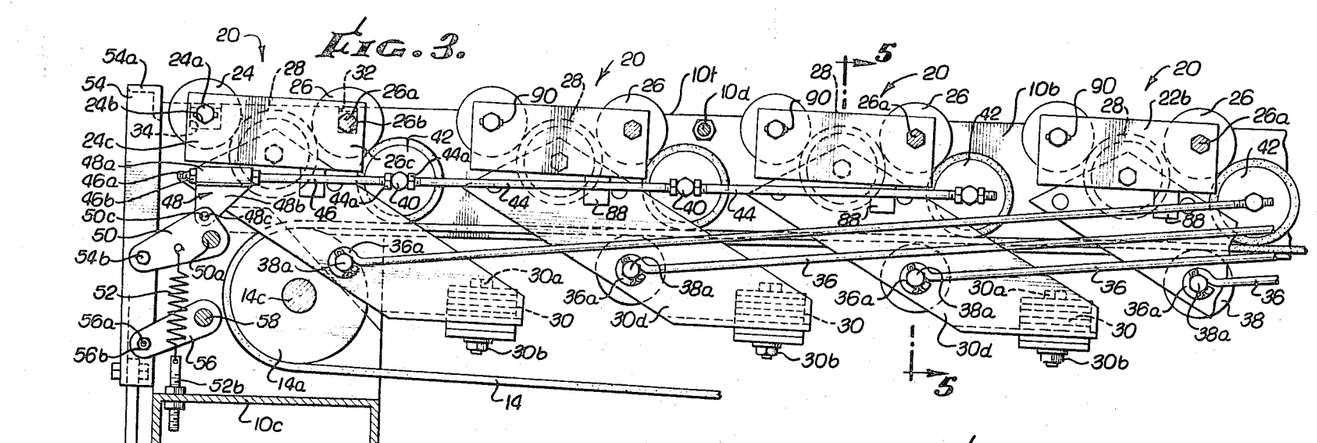
FIGURE 3 is a sectional, partly fragmented, side view of the upper forward portion of the conveyor taken on line 3—3 in FIGURE 2, and showing portions of the structure in phantom.

Each of the roller assemblies 20 (save for the group without counterweights 30 on the receiving end 19a of the conveyor) is laterally mounted for pivotal movement about pivot or rear roller 26 between the side walls 10a and 10b of frame 10. This pivotal movement is provided by extended end portions of pivot roller shafts 26a being adapted to rest in rectangular slots 32 cut down through the opposing top surfaces 10d and 10e, and also the adjoining sides of walls 10a and 10b, as shown in FIGURES 3 and 4.

The extended ends of trigger or forward roller shafts 24a are loosely mounted in slots 34 cut down through the top surfaces 10d and 10e and adjoining side walls 10a and 10b forward of the corresponding slots 32 for the same roller assembly 20. These slots 34 have a floor portion which stops downward movement of shafts 24a when the top surface of trigger roller 24 is level with the top surface of pivot roller 26. However, the rest of slot 34 is open and spaced to permit upward movement of trigger roller 24 therein. Thus, since the counterweight 30 is attached underneath the assembly 20 to the rear of pivot roller 26, rotary force tending to lift trigger roller 24 is developed. The amount of this force is adjusted by varying the weight and position of counterweight 30 so that trigger roller 24 will be slightly lifted when unloaded, but will be depressed by the weight of the lightest package or article 19b to be carried on the conveyor.

Each of the counterweight supporting plates 30c and 30d has a straight connecting rod 36 secured thereto by a hook end 36a fitting about a hexagonal stud 38a projecting through the plates 30c and 30d, between the location of their mounting to idler roller 28 and their support of counterweight 30 on flanges 30f. These studs 38a are normally located slightly below the upper surface of conveyor belt 14 and, save for the studs 38a which are nearest the discharge end 19c of the conveyor, are the axles of end shafts upon which lateral supporting rollers 38 mounted beneath the upper portion of conveyor belt 14 are suspended. Other lateral supporting rollers 39, as shown in FIGURE 4, are rotatably mounted by end shafts 39a to structures 39b secured to frame 10 to support the bottom of conveyor belt 14.

The connecting rods 36 incline upwardly from studs 38a toward the vicinity of another roller assembly 20 to the rear of their connection with counterweight supporting plates 30c and 30d. The end 36b of each connecting rod 36 remote from its attachment to a stud 38a, is threaded through the outer end of the axial shaft 40 of a power roller 42 positioned just behind a rear roller 26 of each roller assembly 20, and with its axis parallel therewith. Preferably, the power rollers 42 have tires or bearing bands 42a circumferentially secured to the periphery thereof, which are positioned to engage the top surface of the conveyor belt 14. They are also adapted to bear against and engage the adjacent rear roller 26 so as to be able to impart rotary movement from belt 14 thereto when there is no weight sufficient to depress the trigger roller 24 of the forward roller assembly 20, to which they are connected by a connecting rod 36. However, when a sufficient amount of weight rests on trigger roller 24 to depress it, counterweight supporting plates 30c and 30d swing back toward the rear or receiving end 19a of the conveyor, thereby causing connecting rods 36 to move the power roller 42 secured thereto generally horizontally out of engagement with the adjacent rear roller 26 so as to impart no further rotary movement thereto. Such disengagement will cause an absolute stoppage of motion imparted to the roller assembly 20.

It can be seen, then, that when a predetermined amount of weight rests on a pivotally mounted roller assembly 20, it will cause another roller assembly 20 to the rear, which is engageable by a power roller 42 having a common connecting rod 36 to become disengaged from the power roller 42. Thus, an article 19b which happens to rest on a disengaged roller assembly 20 will not be moved by rotation of the adjacent power roller 42. This unique feature of the invention is utilized to space packages 19b, carried on the conveyor, from each other, preferably by making the connecting rods 36 approximately the length of the packages or articles 19b to be carried by the invention and balancing the trigger rollers 24 by adjusting counterweights 30 so that they will be depressed by the lightest weight of a package or article 19b. Therefore, a roller assembly 20, which is spaced to the rear of a package or article 19b approximately the length of said article 19b will be disengaged from its power roller 42 and will impart no movement from belt 14 to another package or article 19b which happens to be resting thereon.

Figure 13:
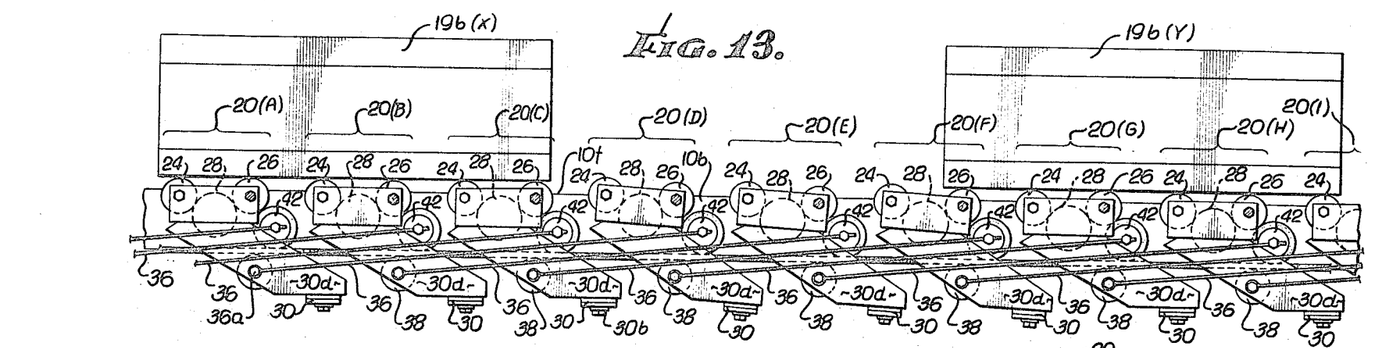
FIGURE 13 is a schematic side view showing a section of a conveyor in operation with packages or articles being moved thereon.

Illustrating the operation of this principle is the schematic side view, in FIGURE 13, of a series of roller assemblies 20 and a couple of packages or articles 19b carried thereon being moved forward from right to left in this view. The roller assemblies 20 are each individually labeled from forward to rear: 20(A), 20(B), 20(C), 20(D), 20(E), 20(F), 20(G), 20(H) and 20(I). Also labeled for purposes of discussion are the forward package or article 19b(X) and the rear package or article 19b(Y), each of which is about the length covered by three roller assemblies 20, as they are spaced longitudinally on this conveyor. Thus, the forward package or article 19b(X) rests on the three roller assemblies 20(A), 20(B) and 20(C) which, in turn, are depressed by the weight of package or article 19b(X) so as to cause the power rollers 42 connected by rods 36 to become generally horizontally disengaged, respectively from roller assemblies 20(D), 20(E) and 20(F), thereby preventing any package or article immediately to the rear of package 19b(X) from pressing forward against it. Ordinarily, packages or articles will be spaced from each other at least the distance between roller assemblies 20, since, if they move any closer, the rear package or article will rest entirely on roller assemblies 20 disengaged from their power rollers 42. As viewed in FIGURE 13, no weight is imposed on the trigger rollers 24 of roller assemblies 20(D), 20(E) and 20(F), so that their respectively connecting roller assemblies 20(G), 20(H) and 20(I) will be engaged with their power rollers 42 to push rear package or article 19b(Y) forward. However, if the forward package or article 19b(X) is stopped in the position shown, the rear package or article 19b(Y) will not be moved forward by roller pressure past the position where it will rest on roller assemblies 20(D), 20(E) and 20(F), though its momentum may carry it a bit further. In like manner, all other packages or articles 19b on the conveyor will be stopped in a pressureless relationship to the immediately forward package or article sequentially, in a manner referred to herein as singulation. If the most forwardly stopped package or article is removed from the conveyor, or allowed to move forward again, then all the packages or articles to the rear thereof will sequentially start to move forward again in singulation, as each of the roller assemblies upon which they are resting becomes engaged with its power roller when the package or article immediately in front of it moves forward. It should be noted that packages or articles are automatically stopped in singulation without stopping the belt 14 or the motor 16, since the power rollers 42 becomes disengaged from belt 14.

A package or article 19b on a conveyor in accordance with this invention can be stopped anywhere along the line, and cause the packages or articles 19b to the rear thereof to stop sequentially without building up pressure between them so as to cause jamming. Though a package or article 19b may be stopped simply by holding it physically in place with enough force to prevent the engaged roller assemblies 24 from driving it forward, it is often desirable to provide a conveyor unloading area, usually immediately adjacent to the discharge end 19c, where stoppage is facilitated by a special mechanism. At the conveyor discharge end 19c, there will be no packages or articles 19b on the conveyor forward thereof, and accordingly, no connecting rods 36 responsively connecting the power rollers 42 in this area to a forward roller assembly 20. However, the power rollers 42 near the conveyor discharge end 19c are linked together by tie rods 44 which horizontally extend longitudinally along each side of the conveyor and are threadably secured by nuts 44a in complementary holes in each of the end shafts 40 protruding from each side of the power rollers 42. Like the other substantially identical power rollers 42, the power rollers 42, near the conveyor discharge end 19c, rest on conveyor belt 14, and normally bear against and engage the pivot or rear roller 26 so as to transmit motion from belt 14 thereto. The number of power rollers 42 near the conveyor discharge end 19c which are linked together by tie rods 44 depends upon the length of the packages 19c, and longitudinal spacing of the roller assemblies 20, since the tie rod connected power rollers 42 engage the group of roller assemblies 20 nearest the discharge end 19c, which are spaced from front to rear about the length of a package thereon. In the drawings, as most clearly viewed in FIGURES 3 and 10, three spaced roller assemblies 20 are the package supporting group which equals the length of a package or article 19b supported thereby, though by maintaining a constant ratio between roller assembly spacing, package or article length and connecting rod length, a fewer or greater number of roller assemblies 20 could be used as the package or article supporting group.

The power roller 42 nearest to the conveyor discharge end 19c has threadably secured into each of its end shafts 40, and extending forward in alignment with the tie rods 42, a linking rod 46, to which is mounted on its forward threaded end a connecting plate 48 formed with a hollow cylindrical portion 48a, within which the threaded forward end 46a of linking rod 46 is secured by nut 46b, and an extended portion 48b tapering to a small rounded end having an opening therein from which a linking pin 48c projects normal to the axis of linking rod 46. Paired engaging plates 50, triangular in shape and formed with rounded corners, are rotatably mounted near each end of a pivot rod 50a, which extends laterally across the conveyor below linking plates 48, and is secured by nuts 50b in mating holes in the opposing inner mounting walls 15a and 15b of frame 10. Mating holes 50c in a corner of engaging plates 50 above pivot rod 50a are adapted to rotatably receive between each pair of engaging plates 50, the linking pin 48c, so as to pivotally connect linking plates 48 therewith.

Figure 10:
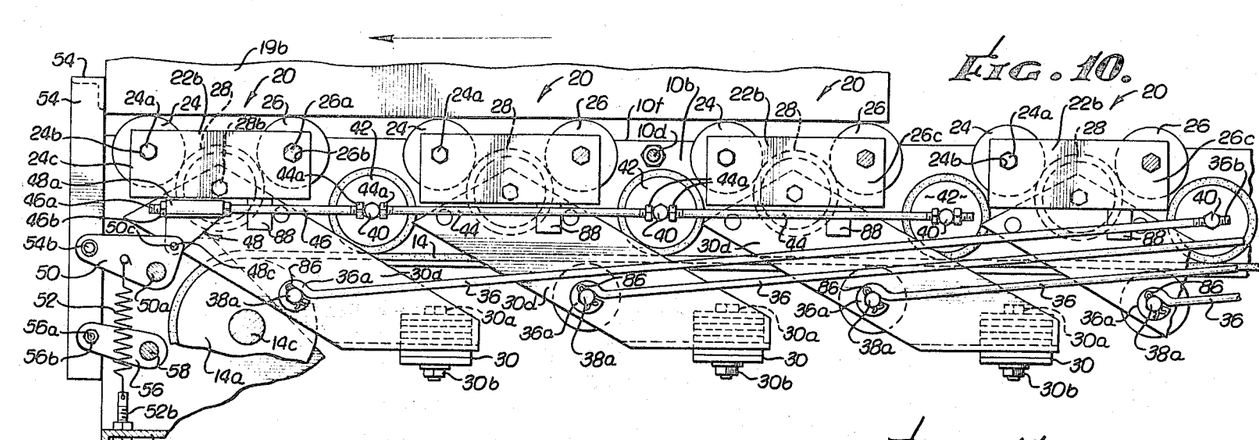
FIGURE 10 is a sectional, partly fragmented view of the upper forward portion of the conveyor as shown in FIGURE 2, but with a package or article carried thereon.

Thus it can be seen that by rotating the engaging plates 50 about the pivot rod 50a clockwise, as viewed in FIGURES 3, 10, 14 and 15, the connected linking plates 48 force the interconnected power rollers 42 through linking rods 46 and tie rods 44 from an engaged position, as shown in FIGURE 3, toward the rear and out of engagement with the rear rollers 26 of the adjacent roller assemblies 20, thereby stopping packages which may be resting thereon, as shown in FIGURE 10.

In order to normally maintain the power rollers 42 in engagement with the rear rollers 26, an engaging spring 52 is secured at one end to a spring pin 52a projecting normally from the side of the outer connected engaging plates 50 in a portion forward from linking pin 48c. The opposite end of spring 52 is secured to an underlying floor channel 10c of the frame 10 by adjustable threaded spring tie down 52b. The amount of engaging pressure of power rollers 42 can thus be adjusted by varying the tension of spring 52.

Figures 14, 15:
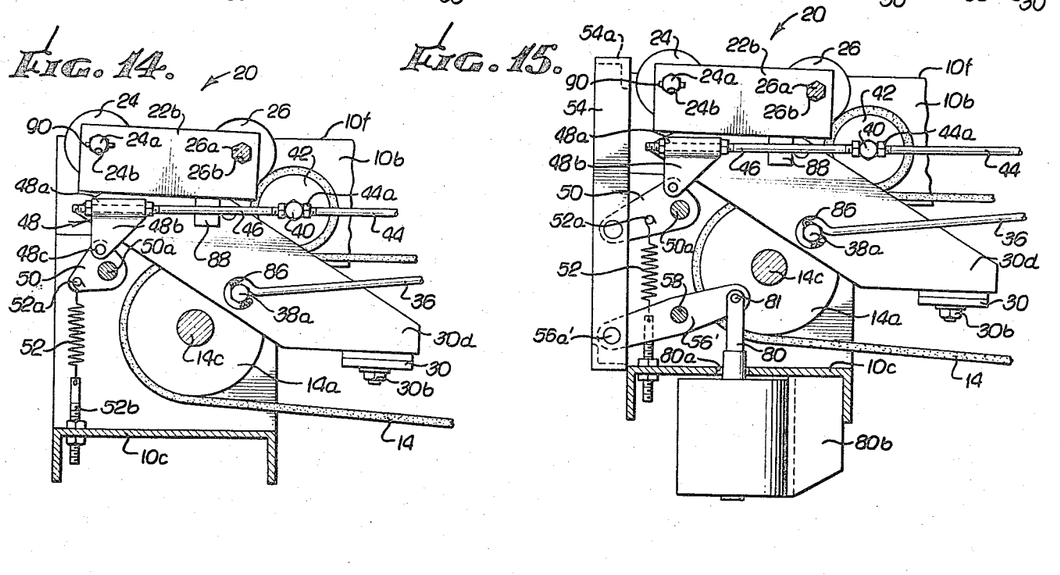
FIGURE 14 is a fragmented side elevational view of another embodiment of mechanism on the discharge end of the conveyor.
FIGURE 15 is a fragmented side elevational view of still another embodiment of mechanism on the discharge end of the conveyor.

The basic form of this stop mechanism at the conveyor head or discharge end 19c is shown in FIGURE 14, wherein simply the components described hereinbefore are utilized and the pivoting of linking plate 50 to disengage power rollers 42 is actuated by direct manual or mechanical pressure. However, in the stop mechanism shown in FIGURES 2, 3, 10 and 15, a gate 54 and corresponding operating mechanism are mounted to move up and down, relative to frame 10, to block the discharge end 19c of the conveyor.

Gate 54 is preferably a rectangular plate type structure which has an upper straight horizontal edge 54a, which can be lifted vertically from a position, as in FIGURE 3, below the plane of the upper surfaces of the rollers in the conveyor to a package blocking position above the plane of the upper surfaces of the rollers, as in FIGURE 10. The gate is pivotally connected at each side by pins 54b projecting through mating holes in extended forward portions of pivot plates 50. Thus, when the gate 54 is lifted, it will pivot linking plates 48 to the rear so as to cause the connecting power rollers to become disengaged though normally it is held in its lower position by the resilient pressure of spring 52.

In order to further support gate 54, and keep its movement subsequently vertical, a pair of guide plates 56 are pivotally secured by bolts 56a and nuts 56b passing therethrough to each side of gate 54 below linking plates 50. The guide plates 56, in turn, are rotatably mounted on a lateral and horizontal guide bar 58, which extends between inner mounting walls 15a and 15b, and through mating holes therein, in which it is secured by nuts 58a threaded on each end thereof.

Figure 1:
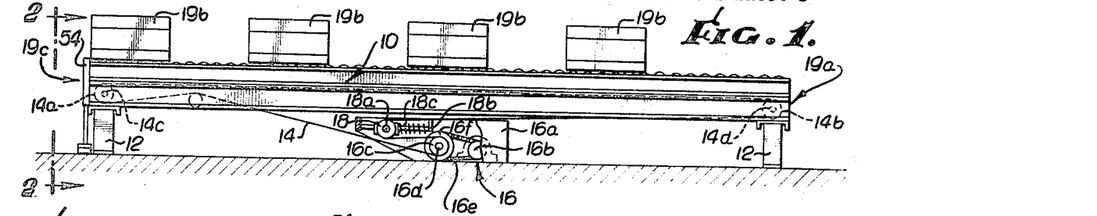
FIGURE 1 is a diagrammatic side elevational view of a conveyor in accordance with this invention with a portion of the structure fragmented, a portion of the motor and the conveyor belt and end rollers therefor shown in phantom and packages shown disposed in spaced relationship on top of the conveyor.
Figure 2:
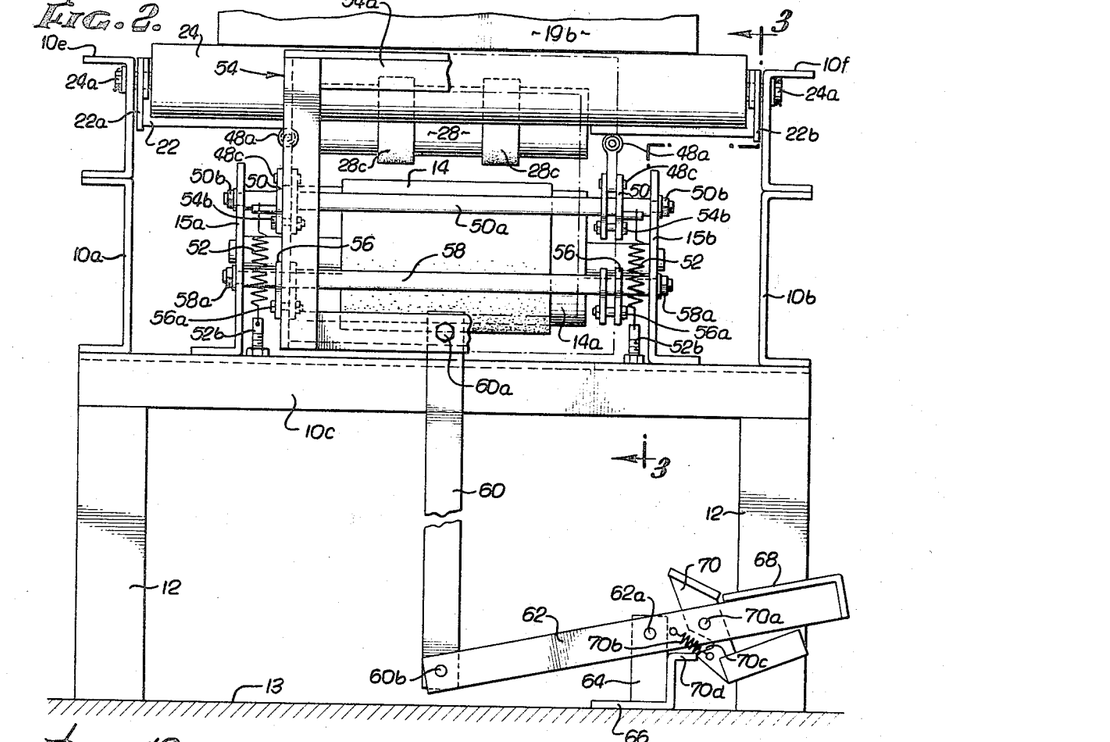
FIGURE 2 is an enlarged end elevational, partly fragmented view of the forward discharge or head end of the conveyor in FIGURE 1, taken on line 2—2 showing a portion of the rollers and connecting linkage in phantom.

A mechanically actuated device is shown in FIGURES 2, 3 and 10 for operating gate 54. As best viewed in FIGURE 2, this consists of a generally vertical bottom link 60 connected by a bolt 60a at its upper end to the lower central portion of gate 54, and pivotally connected at its lower end by a pin 60b to the outer end of a roughly horizontal lever arm 62. The lever arm 62 is pivotally mounted in the middle by a pin 62a passing through a mating hole therein to fulcrum support 64 extending vertically a short distance up from a bottom mounting plate 66, resting on floor 13. The end of lever arm 62, remote from its connection with bottom link 60, is provided with a foot pedal cover 68, which, when depressed, raises connected bottom link 60 and gate 54. The gate 54 is adapted to be held in its raised position, since a locking plate 70 pivotally mounted by pin 70a to the side of lever arm 62 near fulcrum support 64, will be resiliently urged by a locking spring 70b connected between locking plate 70 and lever arm 62 toward lever arm 62 so that a curved cut-out locking notch 70c portion thereof will engage a horizontal locking flange 70d formed by an adjacent portion of bottom plate 66 as it slides adjacent thereto. To unlock the lever arm 62, a release pedal 72, on top of locking plate 70, is depressed to pivot it so that its locking notch 70c is disengaged from locking flange 70d.

In the form of the stop mechanism shown in FIGURE 15, the upper end of a vertically movable arm 80 is pivotally connected by a pin 81 to the modified extended end of at least one of the pivotally mounted guide plates 56′, in a location remote from its interconnection at 56a′, to the gate 54. The lower end of the arm 80 is, in turn, operatively connected through a hole 80a in a floor chanel 10c to a solenoid or cylinder in housing 80b mounted thereunder and adapted to move arm 80 up and down enough to raise and lower gate 54, as hereinbefore described.

Figure 11:
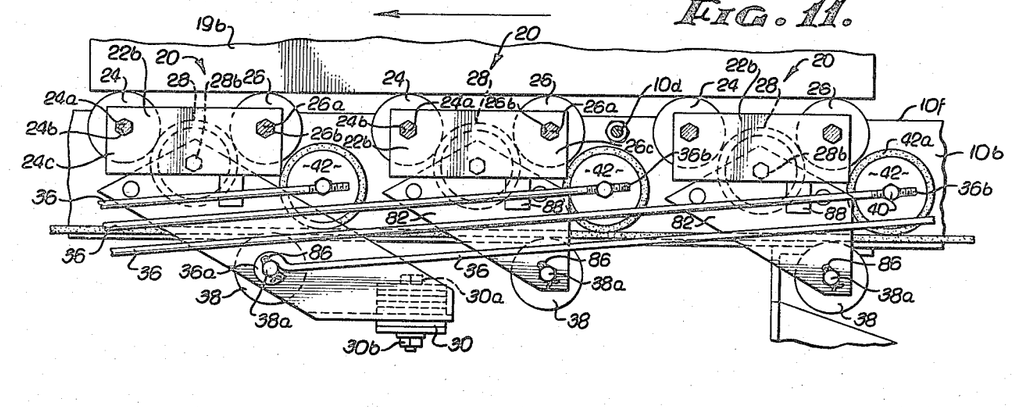
FIGURE 11 is a sectional, partly fragmented side view of the upper portion of the conveyor immediately to the rear of the view shown in FIGURE 10 and with a package or article carried thereon.

The roller assemblies 20 nearest the rear of receiving end 19a of the conveyor, as shown in FIGURES 4 and 11, do not carry counterweights nor are they pivotally mounted since there are no further assemblies 20 to the rear of this group to be actuated by the weight of packages thereon. As in the group of roller assemblies 20 at the conveyor discharge end 19c, the number of non-pivotally mounted roller assemblies 20 at the receiving end 19a depends upon their spacing and the length of the packages to be carried thereon. As shown in the embodiment of this invention best viewed in FIGURE 4, the three roller assemblies 20 nearest the receiving end 19a are longitudinally spaced to about equal, as a group, the length of a package or article to be carried on the conveyor. These roller assemblies 20 are fixedly mounted in the frame 10, so that the upper surfaces of rollers 24 and 26 are disposed in the same plane. The end shafts 24a and 26a, respectively, rest in slotted openings 34 and 32, respectively, cut down through the top surfaces 10e and 10f of sides 10a and 10b, as previously described. The idler wheel 28 end shafts 28b in this rear group of roller assemblies 20 are mounted in pairs of laterally spaced end plates 82, secured vertically to the inner mounting walls 15a and 15b. Except for the pair of laterally spaced end plates 82' nearest the receiving end 19a, each of these end plates 82 is formed with an extended lower portion 82a, having a hexagonal hole 82b located so that the hexagonal end shafts 38a of supporting rollers 38 can be mounted therein in position underneath the upper surface of conveyor belt 14 to provide support therefor. The pair of end plates 82' nearest the conveyor receiving end 19a have no extended lower portion, since they are located above the belt end roller 14b, where no supporting roller 38 is needed.

Figure 12:
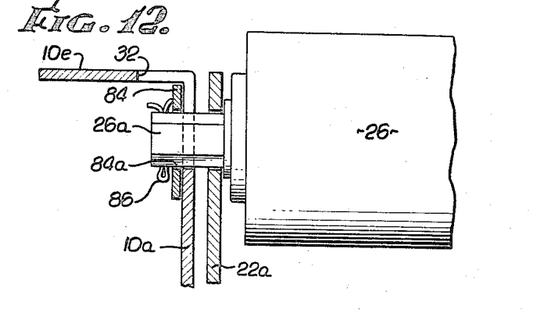
FIGURE 12 is an enlarged, partially fragmented, sectional view of a roller and the end connection of the roller taken on line 12—12 in FIGURE 8.

In order to facilitate maintenance, repair and adjustment of the conveyor, many of the components thereof are adapted to be quickly disassembled. Thus, as best viewed in FIGURE 12, the slot 32, within which the end shaft 26a for a roller 26 is mounted, is cut back further in top surface 10e than the outer end of end shaft 26a extends, a rectangular lock washer 84, longer than the width of the portion of slot 32 cut down in side wall 10a, is mounted through a complementary hole 84a therein on end shaft 26a outside of wall 10a, to hold roller 26 in position, and a cotter pin 86 is inserted through a complementary hole through end shaft 26a to hold locking plate 84 on end shaft 26a. Thus, by pulling cotter pin 86 from shaft 26a, and sliding locking washer 84 therefrom, roller 26 can be lifted out of slot 32. In a similar manner, the shafts 24a are mounted for quick detachment from within slots 34 (and may not be secured therein, since, save for the rear group of roller assemblies 20, the forward or trigger rollers 24 are mounted for limited, generally vertical movement, as hereinbefore described). Also, cotter pins 86 are mounted through complementary holes in the ends of shafts 38a so that when removed, the hook ends 36a of connecting rods 36 can be quickly disconnected therefrom to allow quick adjustment of the threaded ends thereof in shafts 40, or the removal of a complete roller assembly 20.

In order to prevent lateral weaving of the power rollers 42, small rectangular spacer blocks 88 are secured to the outer sides of the counterweight supporting plates 30c and 30d and end plates 82 and 82', so as to abut against the connecting rods 36, and the rods 44 and 46 joining the power rollers 42 to the adjacent roller assembly 20. Lateral movement of the roller assemblies 20 is prevented by inserting spacer pins 90 through complementary holes in the end shafts 24a of the forward rollers 24.

I claim:

1. A pressureless accumulation conveyor including a conveyor frame having an article receiving end and an article discharge end, a plurality of roller assemblies mounted on said conveyor frame and adapted to provide a movable article platform from the receiving to discharge end thereof, wherein the improvement comprises: drive means, power transmitting elements engaged with said drive means and normally engaged individually with each of said roller assemblies so as to impart rotary driving movement thereto toward the discharge end of the conveyor, each of said roller assemblies including a pair of rollers and said roller assemblies are uninterruptedly, sequentially arranged on said frame, a first roller assembly including a pivotal connection with said frame and having a normally raised trigger element which is depressed about said pivotal connection by the weight of an article carried thereon, tie means joining said first roller assembly with the power transmitting element engaged by a second roller assembly spaced therefrom a predetermined distance toward the receiving end from said first roller assembly, said tie means being adapted to completely disengage said connected power transmitting element from said second roller assembly whereby no powered rotation may be imparted to said rollers of said second roller assembly when the trigger element of said first roller assembly is depressed, and engage said power transmitting element with said second roller assembly when said trigger is in its normally raised position to impart common power rotation to said rollers of said second roller assembly.

2. A pressureless accumulation conveyor as defined in claim 1, wherein all of said roller assemblies include a pivotal connection with said frame except for a predetermined group nearest the receiving end of the conveyor.

3. A pressureless accumulation conveyor as defined in claim 2, wherein the roller assemblies each carries a counterweight which causes the trigger element to be normally raised and is releasably depressed about said pivotal connection when balanced by the weight of an article thereon.

4. A pressureless accumulation conveyor as defined in claim 1, wherein the power transmitting elements are power rollers, the drive means includes an endless belt and said power rollers engage said endless belt.

5. A pressureless accumulation conveyor as defined in claim 4, wherein the pivotally mounted roller assemblies include pivot rollers having axes about which said roller assemblies pivot, the trigger elements are forward rollers disposed closer toward the discharge end than said pivot roller in each assembly and engaged therewith for common rotation, and the power rollers are engageable with the pivot rollers to transmit rotary motion to said roller assemblies.

6. A pressureless accumulation conveyor as defined in Claim 5, wherein the power rollers engageable with a predetermined group of roller assemblies nearest the discharge end of the conveyor are interconnected and disengageable from said roller assemblies by a stop mechanism operatively associated therewith.

7. A pressureless accumulation conveyor including an elongated conveyor frame extending from an article receiving end to an article discharge end and formed with upright laterally spaced side walls and a substantially open top; a plurality of sequential roller assemblies laterally mounted between the side walls of said conveyor frame above said conveyor belt, said roller assemblies being longitudinally spaced a predetermined distance from each other and extending from the receiving end to the discharge end of said conveyor frame, wherein the improvement comprises: an endless conveyor belt rotatably carried by belt rollers laterally mounted between the side walls of said conveyor frame below said roller assemblies, said belt extending substantially from the receiving end to the discharge end of said conveyor frame for longitudinal movement relative thereto; motor drive means engaging said conveyor belt and adapted to move it longitudinally of said conveyor frame from said receiving end to said discharge end thereof; each of said conveyor assemblies including a laterally mounted forward roller and a laterally mounted rear roller adapted for common rotation, said forward and rear rollers mounted relative to said conveyor frame so that their upper surfaces project above the open top of said frame and are adapted to provide a substantially level, movable, package carrying surface, each of said roller assemblies except for a predetermined group nearest to the receiving end being pivotally mounted between the side walls of said frame on the axis of the rear roller therein and balanced so that the upper surfaces of the forward rollers are lifted to a raised trigger position above the plane of the article carrying surface when unweighted, but are depressed to an actuating position where the upper surfaces of the forward rollers are in the plane of the article carrying surface when carrying a predetermined minimum weight of article thereon; power rollers rotatably engaged with said conveyor belt and engageable with the rear roller of each roller assembly to transmit rotary motion thereto; connecting means joining each of said pivotally mounted roller assemblies with a power roller engageable by another sequential roller assembly spaced a pretermined distance rearwardly toward the receiving end than said connected roller assembly, said power roller being engaged with the adjacent rear roller when the connected roller assembly is pivoted to its trigger position but disengaged therefrom when depressed to its actuating position and wherein the predetermined distance between the pivotally mounted roller assembly and the connected power roller is adapted to substantially equal the length of article to be carried on the conveyor so that sequential roller assemblies are disengaged immediately to the rear of a supported article so as to automatically prevent bunching of articles toward the receiving end thereof.

8. A pressureless accumulation conveyor as defined in claim 7, wherein the pivotally mounted roller assemblies are balanced by adjustable counterweights carried by said roller assemblies.

9. A pressureless accumulation conveyor as defined in claim 8, wherein supporting plates are secured to each pivotally mounted roller assembly which extend to carry said counterweights below and toward the receiving end of the conveyor relative to the pivoting axis of each rear roller thereby tending to impart a component of rotary movement toward the discharge end of said conveyor, the connecting means are connecting rods secured to said supporting plates and to a power roller located toward the receiving end therefrom, and the connected power roller is disposed toward the receiving end of the conveyor relative to the engageable rear roller of the adjacent roller assembly so that when the connected roller assembly is in its raised trigger position said power roller is pulled generally horizontally toward the conveyor discharge end to engage the adjacent rear roller and when the connected roller assembly is in its depressed actuating position the connected power roller is pushed generally horizontally toward the conveyor receiving end to become disengaged from the adjacent rear roller.

10. A pressureless accumulation conveyor as defined in claim 7, wherein an intermediate idler wheel is included in each roller assembly which bears against the forward and rear rollers therein to impart rotary motion between them.

11. A pressureless accumulation conveyor as defined in claim 7, wherein the power rollers engageable with a predetermined group of sequential roller assemblies nearest the discharge end of the conveyor are interconnected for unitary longitudinal movement by tie rods and a stop mechanism is operatively associated with said power rollers so as to be able to engage and disengage each of the power rollers from the rear roller of an adjacent roller assembly.

12. A pressureless accumulation conveyor as defined in claim 11, wherein the stop mechanism includes a vertically movable gate adapted to be raised to a blocking position above the level of the package carrying surface at the discharge end of the conveyor and lowered below said article carrying surface, and wherein linkage means connects said gate and tie rod interconnected power rollers so that when said gate is raised to said blocking position the power rollers are disengaged, and when the gate is lowered below the package carrying surface the power rollers are engaged.

13. A pressureless accumulation conveyor as defined in claim 12, wherein the moveable gate is operated by pivotally connected manual actuating and release apparatus.

14. A pressureless accumulation conveyor as defined in claim 12, wherein the movable gate is operated by a powered actuating and release apparatus.

References Cited

UNITED STATES PATENTS

| | | | |
|---|---|---|---|
| 3,066,788 | 12/1962 | Christiansen | 198—34 |
| 3,122,232 | 2/1964 | Burt | 198—127 |
| 3,285,391 | 11/1966 | Fix | 198—127 |

EDWARD A. SROKA, *Primary Examiner.*

U.S. Cl. X.R.

198—127